US012317043B2

(12) United States Patent
Han

(10) Patent No.: US 12,317,043 B2
(45) Date of Patent: May 27, 2025

(54) VIBRATING DIAPHRAGM ARRAY

(71) Applicant: Shenzhen Linearup Technologies Ltd., Shenzhen (CN)

(72) Inventor: Jiyan Han, Harbin (CN)

(73) Assignee: Shenzhen Linearup Technologies Ltd., Shenzhen (CN)

( * ) Notice: Subject to any disclaimer, the term of this patent is extended or adjusted under 35 U.S.C. 154(b) by 217 days.

(21) Appl. No.: 18/120,834

(22) Filed: Mar. 13, 2023

(65) Prior Publication Data

US 2024/0107236 A1 Mar. 28, 2024

(30) Foreign Application Priority Data

Sep. 28, 2022 (CN) ......................... 202211192740.0

(51) Int. Cl.
*H04R 7/14* (2006.01)

(52) U.S. Cl.
CPC ......... *H04R 7/14* (2013.01); *H04R 2307/207* (2013.01)

(58) Field of Classification Search
CPC ....... H04R 7/14; H04R 7/20; H04R 2307/207
See application file for complete search history.

(56) References Cited

FOREIGN PATENT DOCUMENTS

| | | | |
|---|---|---|---|
| CN | 101237717 A | * | 8/2008 |
| CN | 110087171 A | * | 8/2019 |

OTHER PUBLICATIONS

Chinese First Office Action for Chinese Application No. 202211192740.0, dated Sep. 28, 2023, 9 pages with translation.

* cited by examiner

*Primary Examiner* — Sunita Joshi
(74) *Attorney, Agent, or Firm* — Workman Nydegger

(57) ABSTRACT

A vibrating diaphragm array is provided, including multiple vibrating diaphragm bodies arranged abreast. A gap between every two adjacent vibrating diaphragm bodies of the multiple vibrating diaphragm bodies is provided with a corresponding one of magnets. The every two adjacent vibrating diaphragm bodies are connected in series with each other. The magnets are arranged in parallel with each other. The multiple vibrating diaphragm bodies are provided in a common plane or arranged in an arc-shaped path. The vibrating diaphragm bodies are arranged abreast, so as to constitute the vibrating diaphragm array, and thus the area of the vibrating diaphragms is increased. When the vibrating diaphragms is applied to the full-frequency earphone, the vibrating diaphragm array mode is used therein, so that the user can receive sound at the front, the rear, the left and the right of the ear, and thus the sound can be heard more realistically.

6 Claims, 4 Drawing Sheets

VIBRATING DIAPHRAGM ARRAY

CROSS REFERENCE TO RELATED APPLICATION

This patent application claims the benefit of and priority to Chinese Patent Application No. 202211192740.0, entitled "VIBRATING DIAPHRAGM ARRAY" filed on Sep. 28, 2022, the disclosure of which is incorporated by reference herein in its entirety as part of the present application.

TECHNICAL FIELD

The present disclosure relates to the field of vibrating diaphragm technical, and in particular relates to a vibrating diaphragm array.

BACKGROUND ART

A vibrating diaphragm is an important component of devices such as an acoustics device, an earphone, and a microphone, and is used for generating or collecting sound. For example, the vibrating diaphragm can be used for a high frequency of a loudspeaker. Recently, the vibrating diaphragm is used for a full-frequency earphone. In the prior art, there is usually one vibrating diaphragm. However, since there is only one vibrating diaphragm, the sound production area of the vibrating diaphragm is small. The vibrating diaphragm is also close to the ear of a user. So, the vibrating diaphragm can only product sound in a partial area of the ear, and thus the sound effect of the earphone is affected.

SUMMARY

The purpose of the present disclosure is to provide a vibrating diaphragm array to solve at least one of the above described technical problems.

In order to solve the described problem, as one aspect of the present disclosure, the present disclosure provides a vibrating diaphragm array, including multiple vibrating diaphragm bodies arranged abreast. A gap between every two adjacent vibrating diaphragm bodies of the multiple vibrating diaphragm bodies is provided with a corresponding one of magnets. The every two adjacent vibrating diaphragm bodies are connected in series with each other, the magnets are arranged in parallel with each other, and the multiple vibrating diaphragm bodies are provided in a common plane or arranged along an arc-shaped path.

In some embodiments, each of the multiple vibrating diaphragm bodies may be formed with a transverse texture, which is extended perpendicular to a longitudinal direction of the one of the magnets.

In some embodiments, each of the multiple vibrating diaphragm bodies may include a first end, a vibrating diaphragm section and a second end which are sequentially arranged from top to bottom. Stiffness reinforcing structures may be provided in the vibrating diaphragm section and extend along a direction of the first end to the second end; and an extending path of each of the stiffness reinforcing structures may have an amplitude which is perpendicular to the direction from the first end to the second end.

In some embodiments, the extension path may extend along a path of a periodic curve.

In some embodiments, the vibrating diaphragm section may be provided with the stiffness reinforcing structures which are arranged in parallel with each other.

In some embodiments, the periodic curve may be a continuous S-shaped curve.

In some embodiments, each of the stiffness reinforcing structures may be an indentation or a protrusion formed on a corresponding one of the multiple vibrating diaphragm bodies.

In the described technical solutions, the present disclosure adopts multiple vibrating diaphragm bodies arranged abreast, so as to constitute the vibrating diaphragm array, and thus the area of the vibrating diaphragms is increased. When the vibrating diaphragm according to the present disclosure is applied to the full-frequency earphone, the vibrating diaphragm array mode is used in the full-frequency earphone, so that the user can receive sound at the front, the rear, the left and the right of the ear, and thus the sound can be heard more realistically.

Figure 1:
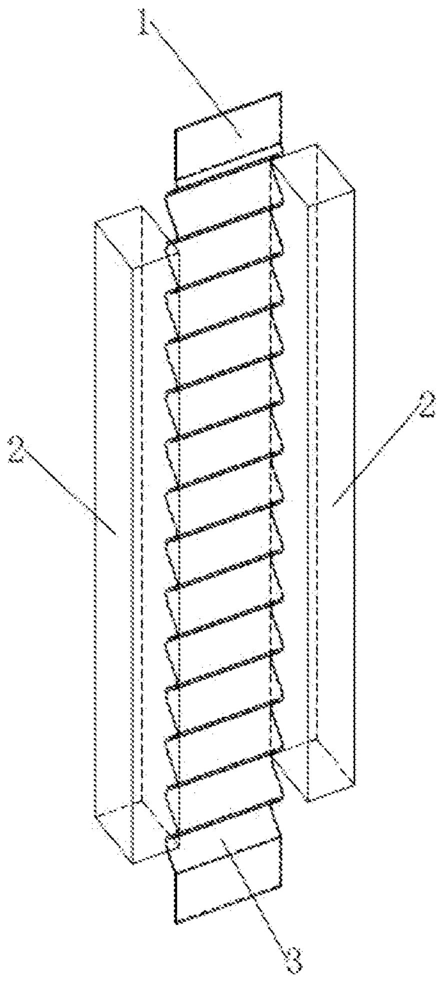
FIG. 1 schematically shows a structural schematic diagram of a vibrating diaphragm assembly in the prior art.
Figure 2:
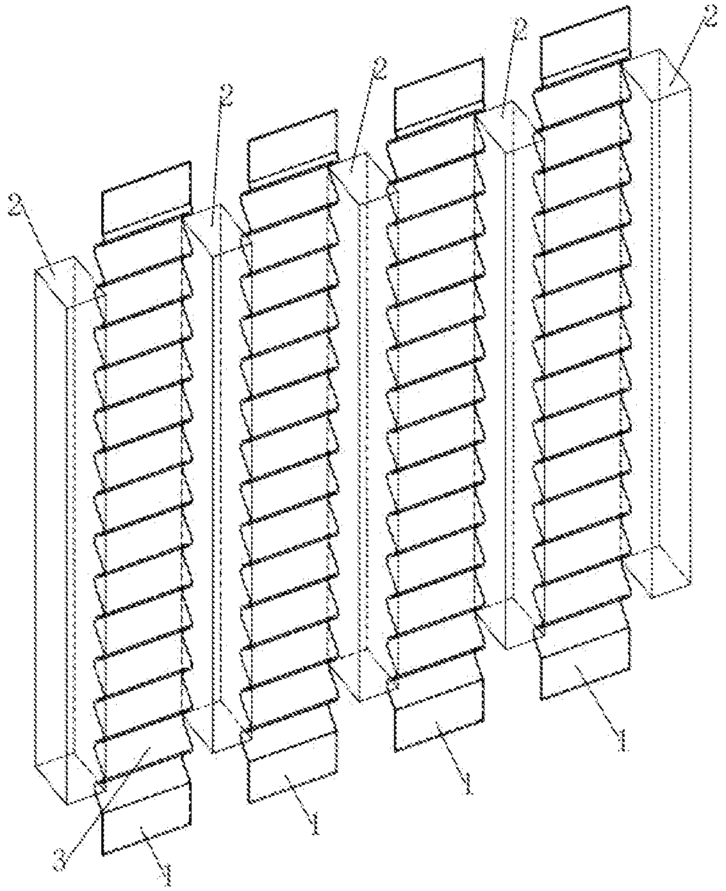
FIG. 2 schematically shows a structural schematic diagram of a vibrating diaphragm array according to a first embodiment of the present disclosure.
Figure 3:
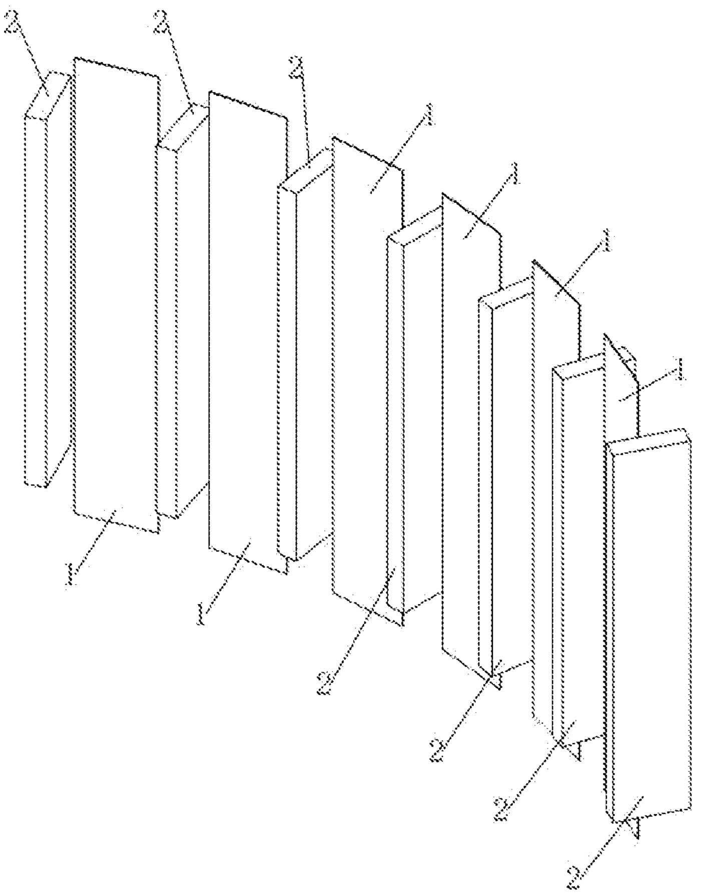
FIG. 3 schematically shows a structural schematic diagram of a vibrating diaphragm array according to a second embodiment of the present disclosure.
Figure 4:
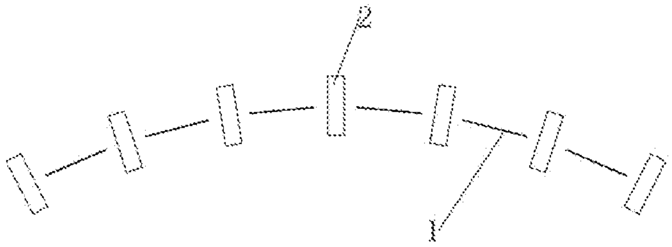
FIG. 4 schematically shows a top view of the vibrating diaphragm array in FIG. 3.
Figure 5:
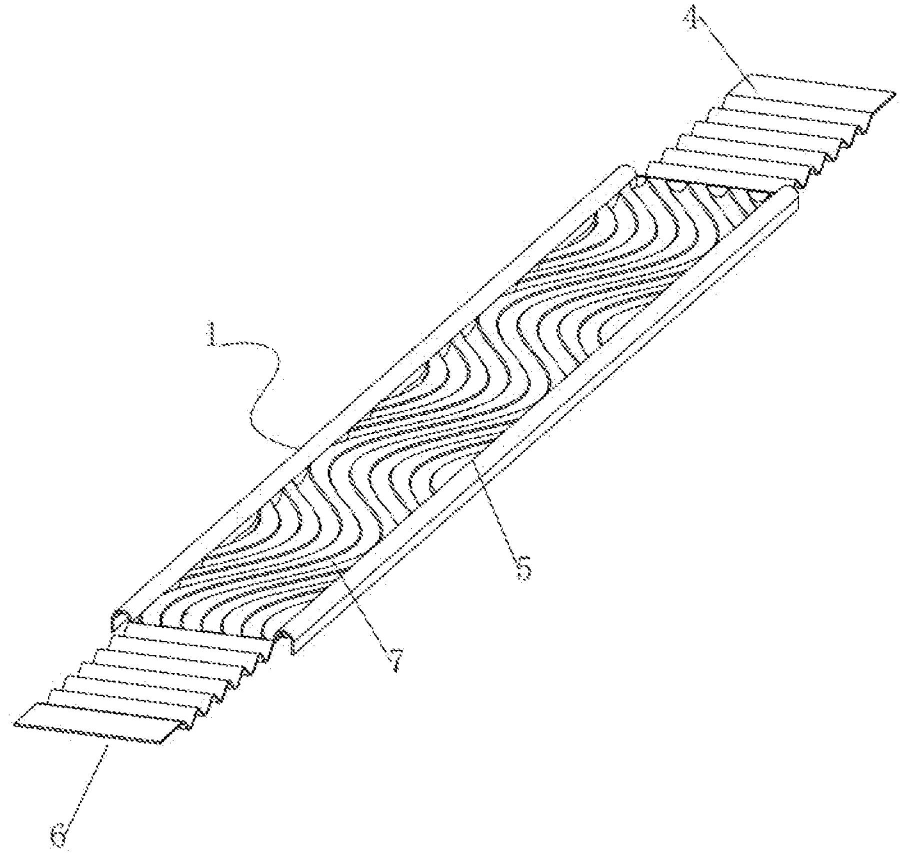
FIG. 5 schematically shows a structural schematic diagram of a vibrating diaphragm used in a third embodiment of the present disclosure.

Reference signs: 1 vibrating diaphragm body; 2 magnet; 3 transverse texture; 4 first end; 5 vibrating diaphragm section; 6 second end; 7 stiffness reinforcing structure.

DETAILED DESCRIPTION OF THE EMBODIMENTS

Embodiments of the present disclosure are described in detail below, but the present disclosure may be implemented in various ways which are defined and covered by the claims.

As one aspect of the present disclosure, a vibrating diaphragm array is provided. The vibrating diaphragm array includes multiple vibrating diaphragm bodies 1 arranged abreast. a gap between every two adjacent vibrating diaphragm bodies 1 of the multiple vibrating diaphragm bodies 1 is provided with a corresponding one of magnets 2. The every two adjacent vibrating diaphragm bodies 1 are connected in series with each other. The magnets 2 are arranged in parallel with each other, and the multiple vibrating diaphragm bodies 1 are provided in a common plane or arranged along an arc-shaped path.

In the described technical solution, the present disclosure adopts multiple vibrating diaphragm bodies 1 arranged abreast, so as to constitute the vibrating diaphragm array, and thus the area of the vibrating diaphragms is increased. When the vibrating diaphragms according to the present disclosure is applied to the full-frequency earphone, the vibrating diaphragm array mode is used, so that the user can receive sound at the front, the rear, the left and the right of the ear, and thus the sound can be heard more realistically.

In an embodiment, preferably, each of the multiple vibrating diaphragm bodies 1 is formed with a transverse texture 3, which is extended perpendicular to a longitudinal direction of the one of the magnets 2.

The vibrating diaphragm is an important component of devices such as an acoustics device, an earphone, and a microphone, and is used for generating or collecting sound. In the prior art, the vibrating diaphragm generally only has a transverse texture, and is poor in rigidity. When the vibrating diaphragm vibrates, it is deformed integrally, and has a large distortion. Therefore, in another embodiment, preferably, each of the multiple vibrating diaphragm bodies 1 includes a first end 4, a vibrating diaphragm section 5 and a second end 6 which are sequentially arranged from top to bottom. Stiffness reinforcing structures 7 are provided in the vibrating diaphragm section 5 and extend along a direction of the first end 4 to the second end 6. An extending path of each of the stiffness reinforcing structures 7 has an amplitude, which reciprocates in a left-right direction or positive-negative direction and is perpendicular to the direction from the first end 4 to the second end 6.

Preferably, the extending path extends along a path of a periodic curve. Preferably, the periodic curve is a continuous S-shaped curve, which is similar to a sine curve, a cosine curve, or a wave-shaped curve.

Preferably, the vibrating diaphragm section 5 is provided with the stiffness-enhancing structures 7 which are arranged in parallel with each other.

Preferably, each of the rigidity reinforcement structures 7 is an indentation or a protrusion formed on a corresponding one of the multiple vibrating diaphragm bodies 1.

In the described technical solutions of the present disclosure, the stiffness reinforcing structure extends in a longitudinal direction of the vibrating diaphragm body, and the amplitude extends in a transverse direction of the vibrating diaphragm body, so that the stiffness of the vibrating diaphragm body can be reinforced both in the longitudinal and transverse directions. Therefore, when the vibrating diaphragm bodies vibrate, they displace as a whole, the stiffness thereof are higher and the distortion thereof are lower.

The above description is only the preferred embodiments of the present disclosure and is not intended to limit the present disclosure. For those skilled in the art, the present disclosure may have various modifications and variations. Any modifications, equivalent replacements, improvements and the like made within the spirit and principle of the present disclosure shall belong to the scope of protection of the present disclosure.

What is claimed is:

1. A vibrating diaphragm array, comprising a plurality of vibrating diaphragm bodies (1) arranged abreast, wherein a gap between every two adjacent vibrating diaphragm bodies (1) of the plurality of vibrating diaphragm bodies (1) is provided with a corresponding one of magnets (2), the every two adjacent vibrating diaphragm bodies (1) are connected in series with each other, the magnets (2) are arranged in parallel with each other, and the plurality of vibrating diaphragm bodies (1) are provided in a common plane or arranged along an arc-shaped path, wherein each of the plurality of vibrating diaphragm bodies (1) comprises a first end (4), a vibrating diaphragm section (5) and a second end (6) which are sequentially arranged from top to bottom; stiffness reinforcing structures (7) are provided in the vibrating diaphragm section (5) and extend along a direction of the first end (4) to the second end (6); and an extending path of each of the stiffness reinforcing structures (7) has an amplitude which is perpendicular to the direction from the first end (4) to the second end (6).

2. The vibrating diaphragm array according to claim 1, wherein each of the plurality of vibrating diaphragm bodies (1) is formed with a transverse texture (3), which is extended perpendicular to a longitudinal direction of the one of the magnets (2).

3. The vibrating diaphragm array according to claim 1, wherein the extending path extends along a path of a periodic curve.

4. The vibrating diaphragm array according to claim 1, wherein the vibrating diaphragm section (5) is provided with the stiffness reinforcing structures (7) which are arranged in parallel with each other.

5. The vibrating diaphragm array according to claim 3, wherein the periodic curve is a continuous S-shaped curve.

6. The vibrating diaphragm array according to claim 1, wherein each of the stiffness reinforcing structures (7) is an indentation or a protrusion formed on a corresponding one of the plurality of vibrating diaphragm bodies (1).

* * * * *